INVENTOR.
LLOYD H. JOICHI

June 3, 1969  L. H. JOICHI  3,447,406
METHOD OF MACHINING EXTERNAL SURFACES ON A GEAR CASE
Filed Feb. 21, 1967

INVENTOR.
LLOYD H. JOICHI
BY
Olsen and Stephenson
ATTORNEYS

United States Patent Office 3,447,406
Patented June 3, 1969

3,447,406
METHOD OF MACHINING EXTERNAL SURFACES ON A GEAR CASE
Lloyd H. Joichi, Detroit, Mich., assignor to La Salle Machine Tool Inc., Warren, Mich., a corporation of Michigan
Filed Feb. 21, 1967, Ser. No. 617,699
Int. Cl. B23b 1/00; B23q 17/00
U.S. Cl. 82—1                                3 Claims

ABSTRACT OF THE DISCLOSURE

A method for machining the external surfaces of a gear case wherein the machined surfaces are machined until they are located predetermined distances from one of the side gear thrust faces in the internal cavity in the case to insure that the thrust faces can be subsequently machined to a desired location relative to each other and relative to an external case surface portion.

Cross references to related applications

Figure 1:
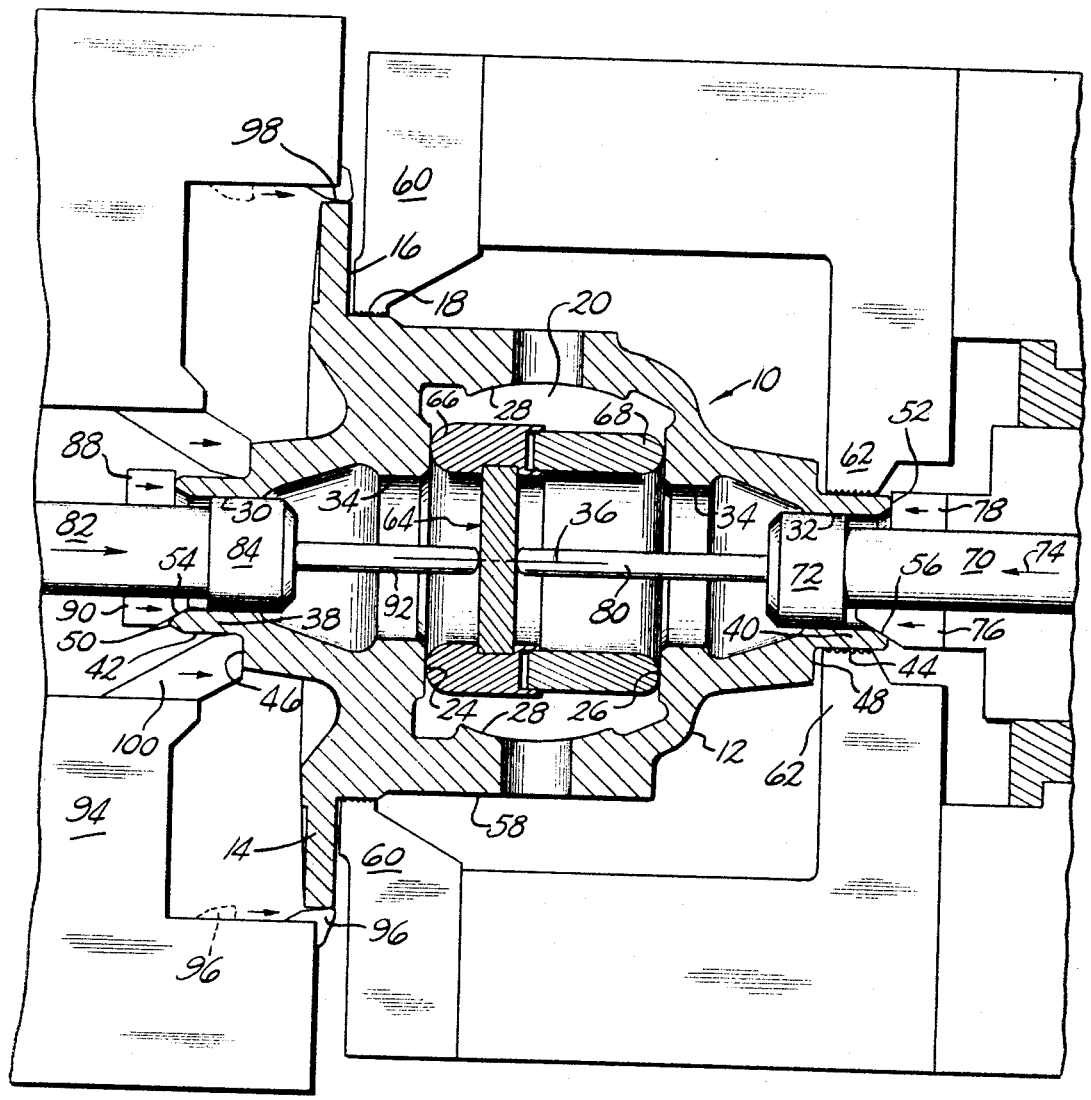

This invention provides a method for machining the external surfaces on gear cases such that the internal surfaces on the cases can be subsequently machined according to the method disclosed in copending application Ser. No. 560,668 filed June 27, 1966, now Patent No. 3,389,454 and assigned to the assignee of this application without unnecessary scrapping of gear cases because dimensional tolerances cannot be met.

Background of the invention

A differential gear case functions in a vehicle drive assembly as a support for a ring gear, side gears, and pinion gears, as illustrated in FIG. 9 in the above-identified application, which is incorporated herein by reference. The critical surfaces in the case, from the standpoint of machining accuracy and tolerances, are, therefore, the various faces and seats inside the case which determine the locations of the gears supported in the case. These faces must be accurately positioned in order to insure the necessary relative locations of the gears to provide for proper operation of the drive assembly.

Heretofore, it has been the practice to machine the external surfaces on a gear case to the point where they are located predetermined distances from one of the faces on the gear case flange which supports a ring gear when the case is installed. The internal faces, the locations of which are critical, are then subsequently machined until they are located predetermined distances relative to each other and to a selected external surface such as a ring gear flange face. The problem in obtaining uniformly machined cases is caused by the fact that the rough castings which are machined to form the finished cases are not of an absolutely uniform size and dimension because the cores which form the internal cavities may not be precisely located from one casting to the next. As a result, when past machining practices were followed many cases were fully machined on the external surfaces and then had to be rejected later because there was insufficient material left on the internal surfaces of the casting to enable the required precise machining of the gear faces. This is due to the fact that, for example, when one side gear face is machined until it is located a predetermined distance from a ring gear flange face, that side gear face may be located at the end of the machining process a distance greater than the allowable tolerance from the other side gear face which has not yet been machined. Consequently, such a casting must be discarded because the other side gear face cannot then be machined without going beyond the allowable tolerances. In summary, therefore, present manufacturing processes disregard stock distribution in the case and thus do not in all cases allow for clean up machining of the internal faces.

Summary of the invention

In the method of this invention, the machining of the gear case external surfaces proceeds only until some of these surfaces are located predetermined distances from one of the unmachined internal side gear faces. This predetermined distance allows for subsequent machining of the side gear face to the desired finish without removing so much material that the opposite side gear face cannot be later machined until it is a predetermined precise distance from the first side gear face. Subsequent machining of other portions of the external surface of the gear case proceed until these surfaces are machined a predetermined distance relative to the first portions that were machined.

It is thus an object of this invention to provide an improved method of machining gear faces which takes into account stock distribution in the castings to be machined and eliminates the cost of machining a casting in which the stock distribution requires rejection.

Figure 2:
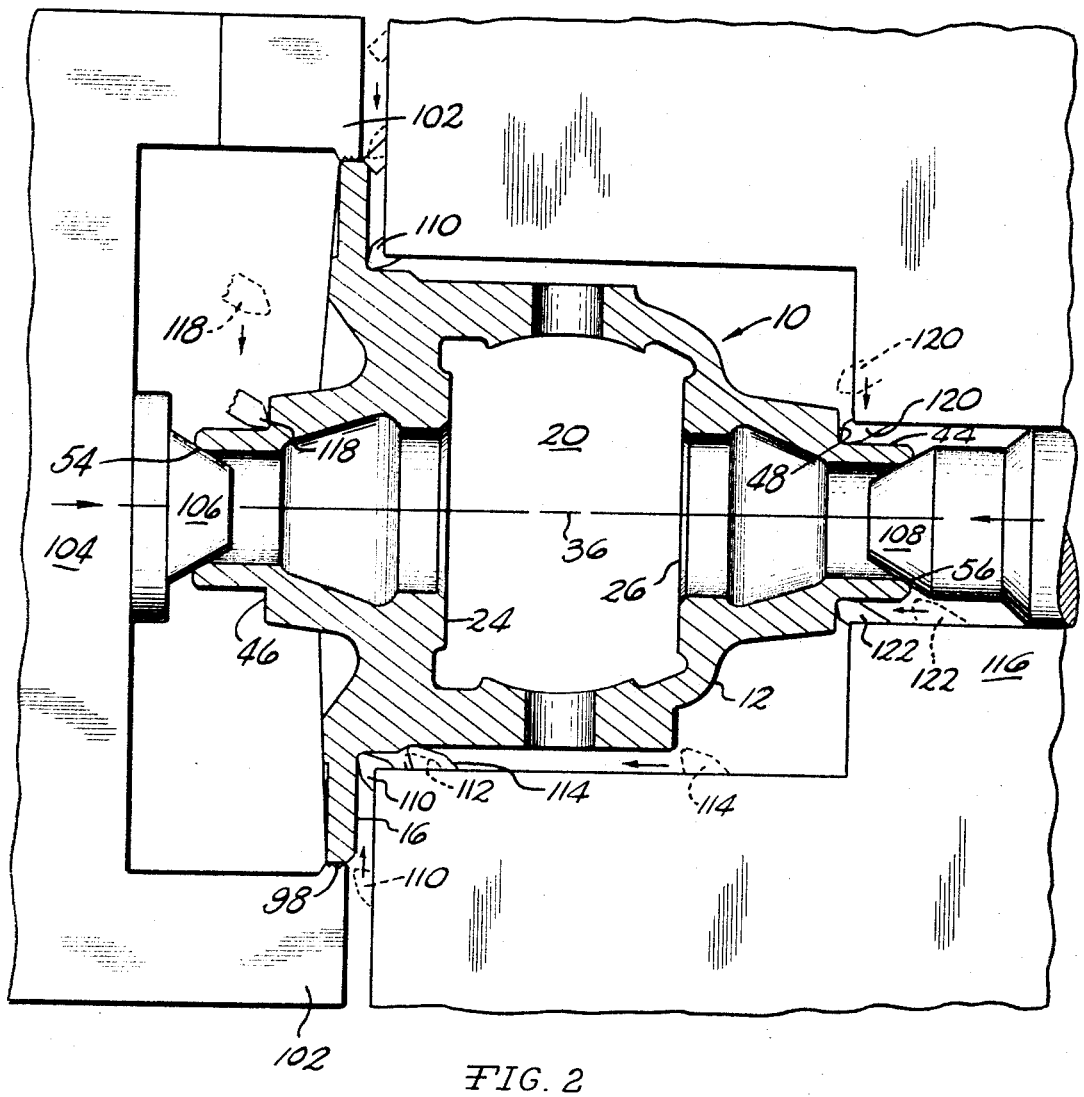

Further objects, features and advantages of this invention will become apparent from a consideration of the following description, the appended claims, and the accompanying drawing in which:

FIGURE 1 is a somewhat diagrammatic view illustrating the initial steps in the machining of a gear case according to the method of this invention, the gear case being shown in section for the purpose of clarity; and FIGURE 2 is a somewhat diagrammatic view like FIG. 1 showing subsequent steps in the machining of a gear case according to the method of this invention.

With reference to the drawing, a differential gear case which is to have its external surfaces machined according to the method of this invention is indiated generally at 10 in FIG. 1. The case 10 consists of a cast body 12, usually formed of nodular iron, provided with a flange 14 to which a ring gear (not shown) is subsequently attached, so that the flange 14 is commonly referred to as the ring gear flange. The flange 14 has a face 16 which communicates with an annular surface 18 on which the ring gear is piloted and which is thus usually referred to as a ring gear pilot surface. The body 12 is cast with an internal cavity 20 bounded on two sides by substantially parallel faces 24 and 26 against which the side gears (not shown) in the differential are positioned so that these faces 24 and 26 are usually referred to as side gear thrust faces. A pair of spherical seats 28 for pinion gears (not shown) form another pair of sides for the internal cavity 20. The body 12 is also formed with axle shaft openings 30 and 32 which communicate with side gear bearing pockets 34 which in turn are connected to the internal cavity 20. The axle shaft openings 30 and 32 and the bearing pockets 34 are concentric with respect to the body axis 36 which is substantially perpendicular to the thrust faces 24 and 26.

The axle shaft openings 30 and 32 are formed in bearing hubs 38 and 40, respectively, which have annular external surfaces 42 and 44, respectively, which terminate at their inner ends at bearing shoulders 46 and 48, respectively. In a finish machined case 10, the hubs 38 and 40 are formed at their outer ends with annular faces 50 and 52, respectively which are substantially perpendicular to the axis 36 and chamfered surfaces 54 and 56, respectively. The body 12 also has a main external surface portion 58 which is machined in a finished case 10.

In the method of this invention, an unfinished gear case 10 is moved through a series of work stations to progressively finish the external surfaces defined above so that these surfaces will be located in predetermined relative positions within defined tolerances. Initially, the rough casting forming the body 12 is gripped by a first group of jaws 60 which engage the ring gear pilot surface 18. A second series of jaws 62 engage the bearing hub 40. The molds in which the bodies 12 are cast are of a construction such that in all instances, the external surface 44 and the pilot surface 18 are concentric with the axis 36, so that when the body 12 is supported in the jaws 60 and 62 as shown in FIG. 1, the bearing hubs 38 and 40 are aligned with the axis 36.

A locating element 64, which is illustrated schematically, is positioned in the cavity 20 so that a locating portion 66 thereof engages the thrust face 24 and a portion 68 of the element 64 is expanded against the opposite thrust face 26. The purpose of the locating element 64 is to locate all of the finish machined external surfaces on the body 12 relative to the thrust face 24, and the portion 68 is expanded into engagement with the thrust face 26 for stability purposes.

A first spindle 70 having a boring head 72 is then moved in the direction of the arrow 74 (FIG. 1) so as to move the head 72 through the bearing hub 40 so as to machine the axle shaft opening 32. The spindle 70 is also equipped with one or more tools 76 which machine the chamfer 56 and one or more tools 78 which machine the bearing hub end face 52. The locating element 64 is operatively associated with the spindle 74 so as to determine the final location of the end face 52 and the chamfer 56, and for illustrative purposes, the spindle 74 is shown as being provided with a projection 80 which engages the locating element 64 in the desired final position of the tools 76 and 78. Thus, in the FIG. 1 position of the spindle 70, the end face 52 and the chamfer 56 are located predetermined spaced distances from the side gear thrust face 24.

A second spindle 82, provided with a similar boring head 84 is moved in the direction of the arrow 86 so as to move the boring head 84 through the bearing hub 38 so as to machine the axle shaft opening 30. Tools 88 and 90 on the spindle 82 machine the hub end face 50 and the chamfer 54. A projection 92 is illustrated on the boring head 84 as being engageable with the locator element 64 to define the final position of the spindle 82 and thus locate the end face 50 and the chamfer 54 in predetermined positions relative to the side gear thrust face 24.

A third spindle 94 carries tools 96 which machine the annular outer surface 98 of the ring gear flange 14 and tools 100 which machine the annular external surface 42 of the bearing hub 38.

It can thus be seen that the method of this invention provides for a location of the bearing hub end faces 50 and 52 and the chamfers 54 and 56 in predetermined locations relative to the side gear thrust face 24. At a subsequent station (FIG. 2) the body 12 is gripped by jaws 102 (FIG. 2) which engage the ring gear surface 98 and are carried in a rotatable spindle 104 for rotating the body 12 about the axis 36. A locating center 106 is moved axially of the spindle 104 into engagement with the chamfer 54 and carries tooling 118 which is moved as shown in FIG. 2 to machine the bearing shoulder 46 to thus locate the shoulder 46 a predetermined distance from the chamfer 54. A similar locating center 108 is engaged with the chamfer 56 and is attached to a head 116. Tooling 110, 112 and 114 carried by the head 116 is then operable to machine the ring gear flange face 16, the pilot surface 18, and the external surface 58, respectively, during rotation of the body 12, so that these surfaces are located a predetermined distance from the chamfer 56. The head 116 also carries tooling 120 which machines the shoulder 48, and tooling 122 which machines the external bearing surface 44. Since the centers 106 and 108 locate the tooling described above, the external surfaces worked by the tooling are machined to predetermined positions relative to the chamfers 54 and 56 which were in turn located relative to the side gear thrust face 24. Thus, when the machining steps illustrated in FIG. 2 have been completed, and it is to be understood that these steps may be accomplished at a plurality of stations, the principal external surfaces of the body 12 have all been machined to predetermined locations determined by the location of the side gear thrust face 24. Subsequently, suitable one or ones of these external surfaces can be utilized for locating purposes during the machining of the thrust faces 24 and 26 with assurance that these faces are in the desired positions.

Past practice involved location of all of the above external surfaces relative to a surface such as the ring gear flange face 16. In the event the cavity 20 was slightly out of position in the casting 12, when it came time to machine the side gear face 24 to locate it a predetermined distance from the face 16, it might be found that the rough face 24 was already in such a closely spaced relation with the face 16 that it could not be machined within the limiting tolerances. On the other hand, it might be found that the face 24 was spaced so far from the face 16 that after the face 24 was finish machined, the distance between the finished face 24 and the rough face 26 was above the allowable tolerances. The result was that the part had to be scrapped after the expense of machining the external surfaces had been incurred. In the method of this invention, this undesirable result is avoided because all of the external surfaces on the body 12 are initially machined so that they are located relative to the face 24. In the event the cavity 20 is so far out of position in a given casting 12 that the casting 12 will have to be scrapped, this determination is evident during the initial machining steps illustrated in FIG. 1. Thus, at such time a poor casting 12 can be rejected and scrapped prior to any investment in the machining of the external surface of the casting. Thus, the cost of machining the external surface of a reject casting is avoided.

It is to be understood that while the projections 80 and 92 on the spindles 70 and 82 are shown to illustrate the function of the locator element 64, other structure is usable for accomplishing this purpose of stopping the spindles in a predetermined position relative to the element 64.

It will be understood that the method of machining external surfaces on a gear case which is herein disclosed and described is presented for purposes of explanation and illustration and is not intended to indicate limits of the invention, the scope of which is defined by the following claims.

What is claimed is:
1. The method of machining the external surfaces of a gear case having an internal cavity provided with a pair of spaced-apart substantially parallel side gear thrust faces to be subsequently machined, and an axis which is substantially perpendicular to said faces, said method comprising the steps of:
  (a) machining predetermined external surface portions of said gear case which extend at an angle to said axis until said surfaces are located a predetermined distance from one of said thrust faces; and
  (b) subsequently machining other portions of said external surface until said other portions are located relative to at least one of said predetermined external surface portions, whereby said case is in condition for subsequent machining of said thrust faces to space said thrust faces a predetermined distance apart and a predetermined distance from at least one of said external surface portions.

2. The method of claim 1 wherein said predetermined external surface portions are machined while said case is maintained in a predetermined position in which the location of said one thrust face is known.

3. The method of claim 2 wherein said other portions of said external surface are machined during rotation of the gear case about the axis thereof.

References Cited

UNITED STATES PATENTS

| | | | |
|---|---|---|---|
| 1,514,352 | 11/1924 | Taylor et al. | 82—1.4 |
| 2,277,613 | 3/1942 | Swenson | 29—406 |

LEONIDAS VLACHOS, *Primary Examiner.*

U.S. Cl. X.R.

29—406